United States Patent
Bump et al.

[11] Patent Number: 5,975,126
[45] Date of Patent: Nov. 2, 1999

[54] METHOD AND APPARATUS FOR DETECTING AND CONTROLLING MASS FLOW

[75] Inventors: Scott S. Bump, Plymouth Meeting; Gary P. Campbell, Hatfield; Joseph C. Dille, Telford, all of Pa.; William W. White, Sparks, Nev.

[73] Assignee: Emerson Electric Co., St. Louis, Mo.

[21] Appl. No.: 09/203,151

[22] Filed: Dec. 1, 1998

Related U.S. Application Data

[63] Continuation of application No. 08/889,641, Jul. 8, 1997, Pat. No. 5,730,181, which is a continuation-in-part of application No. 08/725,859, Oct. 4, 1996, Pat. No. 5,911,238.

[51] Int. Cl.[6] ................................................. F16K 31/12
[52] U.S. Cl. ........................................ 137/487.5; 137/486
[58] Field of Search .............................. 137/487.5, 486; 73/861, 204.15, 204.16, 3

[56] References Cited

U.S. PATENT DOCUMENTS

| | | | |
|---|---|---|---|
| 4,203,465 | 5/1980 | Rissi | 137/487.5 |
| 4,253,156 | 2/1981 | Lisle et al. | 364/571 |
| 4,718,443 | 1/1988 | Adney et al. | 137/487.5 |
| 4,858,643 | 8/1989 | Vavra et al. | 137/487.5 |
| 4,918,995 | 4/1990 | Pearman et al. | 73/861 |
| 5,003,810 | 4/1991 | Jepson et al. | 73/3 |
| 5,062,446 | 11/1991 | Anderson | 137/487.5 |
| 5,129,418 | 7/1992 | Shimomura et al. | 137/486 |
| 5,159,951 | 11/1992 | Ono et al. | 137/487.5 |
| 5,285,673 | 2/1994 | Drexel et al. | 73/3 |
| 5,311,762 | 5/1994 | Drexel | 73/3 |
| 5,325,705 | 7/1994 | Tom | 73/31 |
| 5,359,878 | 11/1994 | Mudd | 73/3 |
| 5,445,035 | 8/1995 | Delajoud | 73/861 |
| 5,583,282 | 12/1996 | Tom | 73/31 |
| 5,730,181 | 3/1998 | Doyle et al. | 137/487.5 |

FOREIGN PATENT DOCUMENTS

| | | | |
|---|---|---|---|
| 0 468 793 A2 | 1/1992 | European Pat. Off. | G01F 15/02 |
| 0 689 040 A2 | 12/1995 | European Pat. Off. | G01F 25/00 |
| 87/00267 | 1/1987 | WIPO | G01C 25/00 |

OTHER PUBLICATIONS

Sheriff, D., "Mass Flow Controller Features Digital Calibration," Solid State Technology, vol. 36, No. 2, pp. 33–34, 36, Feb. 1993.

Drexel, C.F., "Digital Mass Flow Controller," Solid State Technology, vol. 36, No. 6, pp. 73 and 75, Jun. 1993.

"Sensors Offer Fast Response Times–Thermal Mass–Flow Transducers," EDN Electrical Design News, vol. 34, No. 11, pp. 55, 57–58, 60, 62, 64, 66, 68, May 1989.

*Primary Examiner*—Denise L. Ferensic
*Assistant Examiner*—Joanne Y. Kim
*Attorney, Agent, or Firm*—Arnold, White & Durkee

[57] ABSTRACT

A process mass flow instrument for measuring the mass flow rate of a process fluid including a fluid inlet, a fluid outlet, a flow passage connecting the fluid inlet and the fluid outlet, a fluid flow sensor which provides a raw output signal corresponding to an unknown mass flow rate and a processor which contains an empirically derived conversion routine for converting the raw output signal to an adjusted signal indicating the mass flow rate of the process fluid. A method for determining an unknown mass flow using an empirically derived conversion function, the function being derived by correlating the output signals of a mass flow instrument sensing the flow of a calibration fluid with the output signals of the mass flow instrument sensing the flow of the process fluid.

14 Claims, 6 Drawing Sheets

METHOD AND APPARATUS FOR DETECTING AND CONTROLLING MASS FLOW

CROSS-REFERENCE TO RELATED APPLICATIONS

This is a continuation of application Ser. No. 08/889,641, filed Jul. 8, 1997 now U.S. Pat. No. 5,730,181, which is a continuation-in-part of U.S. patent application Ser. No. 08/725,859 filed Oct. 4, 1996, now U.S. Pat. No. 5,911,238 entitled "Thermal Mass Flowmeter and Mass Flow Controller, Flowmetering System and Method," the entire disclosure of which is hereby incorporated by reference.

FIELD OF THE INVENTION

The invention relates to process flow measurement and control devices and, in particular, to thermal mass flow meters and mass flow controllers.

BACKGROUND OF THE INVENTION

The measurement and control of fluid flow can be said to be the very heart of the process industries. In particular, many processes in the semiconductor manufacturing industry require extreme accuracy and repeatability in gas delivery, and thus demand that the mass flow rate of process gases be precisely measured and controlled.

A typical thermal mass flow instrument measures gas flow by routing a small portion of the gas stream through a sensing tube. Heat is applied at the midpoint of the sensing tube, with temperature sensors located on either side of the heater. Each temperature sensor measures the temperature of the gas at its respective location. The first temperature sensor measures the gas temperature upstream of the heater. The second temperature sensor measures the gas temperature downstream of the heater and reflects a temperature corresponding to the gas as heated by the heater. The temperature difference of the gas on either side of the heater is proportional to the mass flow rate of the gas. The relationship between the temperature difference ("$\Delta T$") and mass flow is affected by additional factors such as the specific heat of the gas. Taking these factors into consideration, the ideal relationship is expressed mathematically by the following equation:

$$\Delta T = A * P * C_p * m$$

where $\Delta T$=temperature difference (°K), A=constant of proportionality ($s^2-K^2/kJ^2$), P=heater power, $C_p$=specific heat of the gas at constant pressure and m=mass flow (kg/s). Additionally, other factors unique to each specific mass flow controller and its operating environment affect the above relationship, requiring that each instrument be calibrated to provide accurate mass flow information.

Ideally, manufacturers would calibrate individual mass flow instruments using the actual process gas to be measured in the user's process, based on user-provided operating requirements such as temperature and pressure conditions, flow rates, etc. To calibrate the instrument using a given process gas, the gas is put through the instrument under known conditions and flow rate and the meter is adjusted to provide the desired reading or output signal for the particular mass flow. This process would then be repeated for various flow rates across the instrument's measuring range, resulting in a series of actual output signals and their corresponding adjusted signals indicating mass flow.

The ideal calibration technique discussed above is not possible in practice because the gases to be measured and controlled in many industrial processes, and especially those used in semiconductor manufacturing, are often toxic, corrosive or environmentally unfriendly. For this reason, calibrating mass flow instruments with actual process gases in a production setting is often impractical or impossible. Instead, mass flow instruments are typically calibrated with a "safe" gas such as nitrogen, and a conversion constant is calculated based on properties of the process gas relative to properties of the safe gas. This conversion constant is then applied to the adjusted output signals across the measuring range of the instrument in an attempt to convert the calibration data obtained from the calibration with the safe gas to calibration data that is closer to that which would be expected from a calibration using the actual process gas.

For example, assume that a mass flow controller is calibrated with nitrogen. The gas actually flowing through the mass flow controller is carbon dioxide. Based on the ratio of the molar specific heat of the two gases, a conversion constant of 0.773 may be calculated for converting the flow signal from indicating the flow of nitrogen to the flow of carbon dioxide. If the mass flow controller calibrated with nitrogen has a flow signal indicating 75 standard cubic centimeters (sccm), the flow of carbon dioxide is computed by applying the conversion constant (0.773) to the output reading. Thus, if the mass flow controller reading is 75 sccm, the approximate carbon dioxide flow is 57.98 sccm (75*0.773). This conversion constant is typically applied linearly, or across the instrument's measuring range to convert the flow signal from indicating flow of the calibration gas to indicating flow of the desired process gas.

Applying a single conversion constant across a mass flow instrument's measuring range in this manner has generally proven unsatisfactory. Calculating the conversion constants requires accurate data regarding the process gas heat capacity ($C_p$), but $C_p$ can be a strong and non-linear function of temperature and pressure, which results in a conversion constant that is accurate only for very limited conditions. In other words, the conversion constant necessary to accurately convert a signal indicating the mass flow of a calibration gas to a signal indicating the mass flow of a process gas will not be constant but may be significantly different for varying flow rates, temperatures, pressures, etc. This results significant errors in the final product produced by the process being measured and controlled.

In an attempt to compensate for this problem, prior art solutions, such as that disclosed in U.S. Pat. No. 5,062,446, apply a theoretical conversion factor (i.e., one based on relative gas properties) that is a function of mass flow rate rather than applying a single conversion constant across the measuring range of the mass flow instrument. In effect, this results in a different conversion factor for each flow rate.

As with applying a theoretical conversion constant across the mass flow instrument measuring range, applying a theoretical conversion factor as a function of flow rate generally is not a satisfactory solution to the problem of calibrating a mass flow controller with a gas other than the process gas. $C_p$ is not a well studied gas property for many of the semiconductor compounds, and reliable $C_p$ data do not exist for the nearly is 200 different gas compounds which mass flow instruments typically measure. Moreover, mass flow instruments are also affected by non-ideal factors which are a function of gas density and viscosity as well as the mass flow instrument's geometry, which can lead to inaccurate mass flow measurement with theoretical conversion factors whether applied linearly or as a function of flow rate.

An alternative to calibrating with a "safe" gas and using a theoretically calculated conversion factor is to calibrate the instrument with a "surrogate" gas. A surrogate gas is an inert gas that is selected to mimic as close as possible the thermal properties of the process gas, so it should result in better absolute accuracy when the process gas is measured with the instrument. Using a surrogate gas to calibrate thermal mass flow controllers also has not been adequate. Theoretically, the calibration data should be more accurate across the flow range, but this only holds true if the surrogate gas and the process gas have the same viscosity and density. Further, the thermal properties of the surrogate gas change with small changes in temperature and pressure, resulting in changes in calibration. This leads to instrument to instrument calibration differences, creating undesired variations in the users' processes. Moreover, if multiple process gases are to be measured and controlled with the same mass flow controller, some form of conversion is still necessary. Still further, freons comprise the most common surrogate gases, which are ozone depleting chemicals and do not fit in well with environmental responsibility.

Mass flow users have generally come to accept the above discussed shortcomings with calibrating mass flow meters and controllers as a fact of life. Users attempt to work around problems with mass flow meter and controller calibration by characterizing the mass flow instrument in the process by monitoring some characteristic of the final process, or using the pressure rise characteristics of the process vessel to measure the flow. These attempted solutions are also undesirable because they take time, waste production material, and are inaccurate and non-repeatable.

SUMMARY OF THE INVENTION

The present invention addresses the above discussed limitations and other limitations by providing a mass flow instrument that provides accurate mass flow measurement and control for process gases without requiring calibration of the instrument with the process gas. Further, the present invention addresses shortcomings of the prior art by providing a method of determining fluid mass flow without requiring calibration of the mass flow instrument with the actual process gas.

In accordance with an exemplary embodiment of the present invention, a process mass flow instrument is provided which comprises a fluid inlet, a fluid outlet, a fluid flow sensor which provides a raw output signal corresponding to an unknown mass flow rate, and a processor. The processor contains a conversion routine for converting the raw output signal to an adjusted signal indicating the mass flow rate of the process fluid. The conversion routine is empirically derived using at least one calibration mass flow instrument which is similar to the process mass flow instrument. The output signals of the calibration mass flow instrument sensing the mass flow of a calibration fluid which is different than the process fluid are correlated with the output signals of the calibration mass flow instrument sensing the mass flow of the process fluid. The exemplary mass flow instrument may further include a flow control portion, which may comprise a control unit, a valve drive and a valve.

In accordance with another embodiment of the present invention, a method for determining an unknown mass flow rate of a process fluid flowing through a process mass flow instrument is provided. The process mass flow instrument provides a raw output signal corresponding to mass flow of the process fluid through the process mass flow instrument. The method comprises the acts of providing a calibration fluid which is not the same as the process fluid and providing a mass flow instrument similar to the process mass flow instrument which is used for calibration purposes. The calibration mass flow instrument is calibrated using the calibration fluid, then re-calibrated with the process fluid. The method continues with deriving a process fluid conversion function by correlating the results of the calibrations with the calibration fluid and the process fluid, then the process mass flow instrument is then calibrated with the calibration fluid. The process fluid then is allowed to flow through the process mass flow instrument at an unknown rate, the output signal provided by the process mass flow instrument is determined and applied to the process fluid conversion function to determine the unknown flow rate.

In accordance with yet another embodiment of the present invention, a method for deriving a calibration conversion function for converting an output signal of a mass flow measuring instrument indicating the flow of a calibration fluid to a signal indicating the flow of a process fluid is provided. This method includes the acts of providing a process fluid, providing a calibration fluid which is not the same as the process fluid, calibrating the mass flow instrument with the calibration fluid, re-calibrating the mass flow instrument with the process fluid, and correlating the results of the calibration fluid calibration with the results of the process fluid calibration.

DETAILED DESCRIPTION OF THE INVENTION

Figure 1:
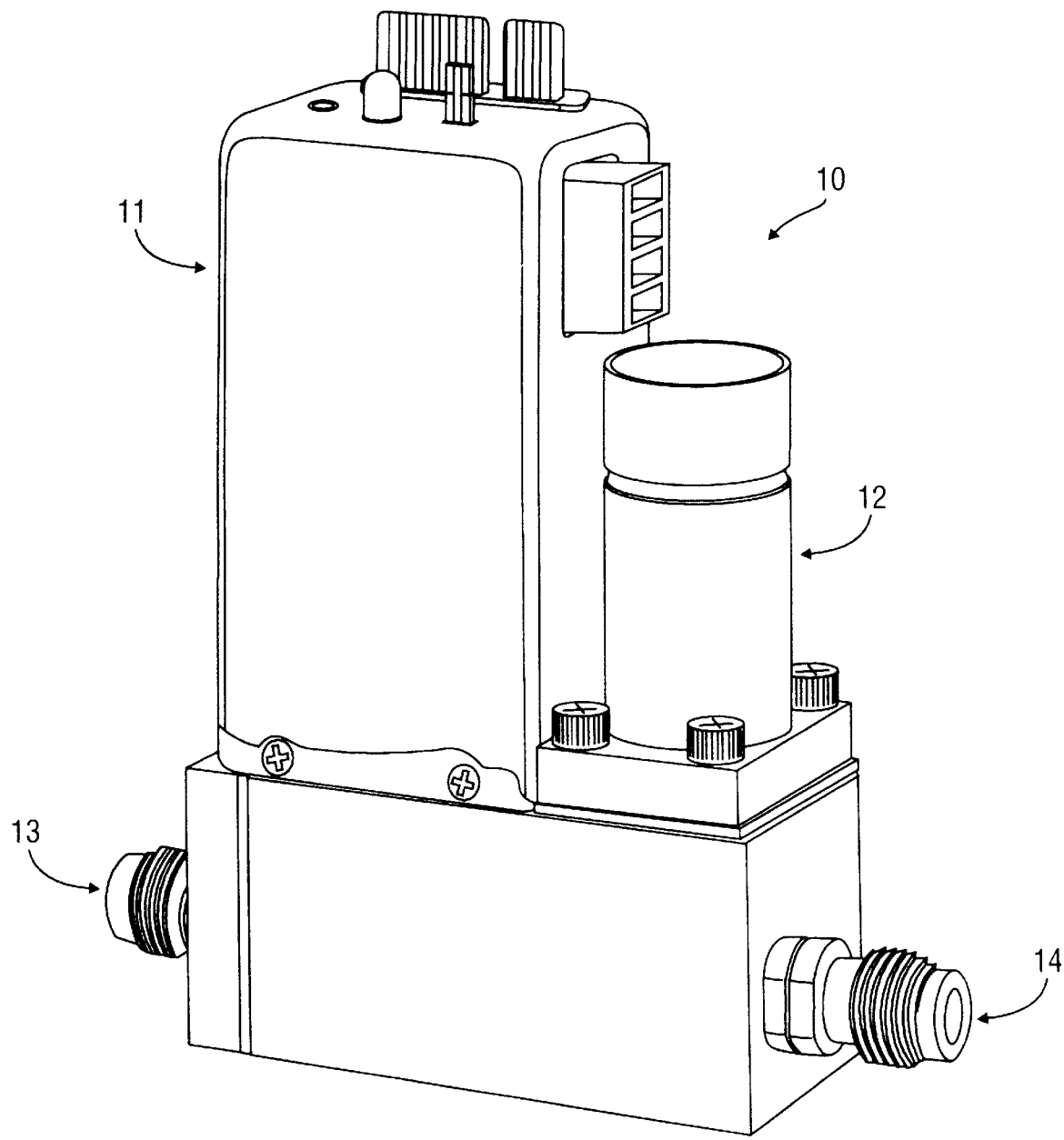
FIG. 1 shows a perspective view of an embodiment of a mass flow controller in accordance with the present invention.

Turning to the drawings and, in particular, FIG. 1, a perspective view of a thermal mass flow controller 10 in accordance with the present invention is provided. In general, the mass flow controller 10 comprises a flow meter portion 11, a flow control portion 12, a gas inlet 13 and a gas outlet 14.

A thermal mass flow meter in accordance with the present invention (not shown) would be identical to the mass flow controller 10 illustrated in FIG. 1, except the mass flow meter would not include the flow control portion 12. In this disclosure, the term "mass flow instrument" refers to a mass flow meter or controller, or other device capable of measuring fluid mass flow.

The mass flow controller 10 further includes a processor having a memory (not shown). In a preferred embodiment of the invention, the processor is a Motorola 3150 "Neuron."

Data stored in the instrument's memory include, but are not limited to calibration tables, descriptive information about the specific mass flow controller such as the mass flow controller's serial number, model code, control valve power-off state, and hardware and firmware version identifiers, flow system measurements including valve voltage, sensor temperature, the linearized flow sensor signal, and the raw flow signal.

Figure 2:
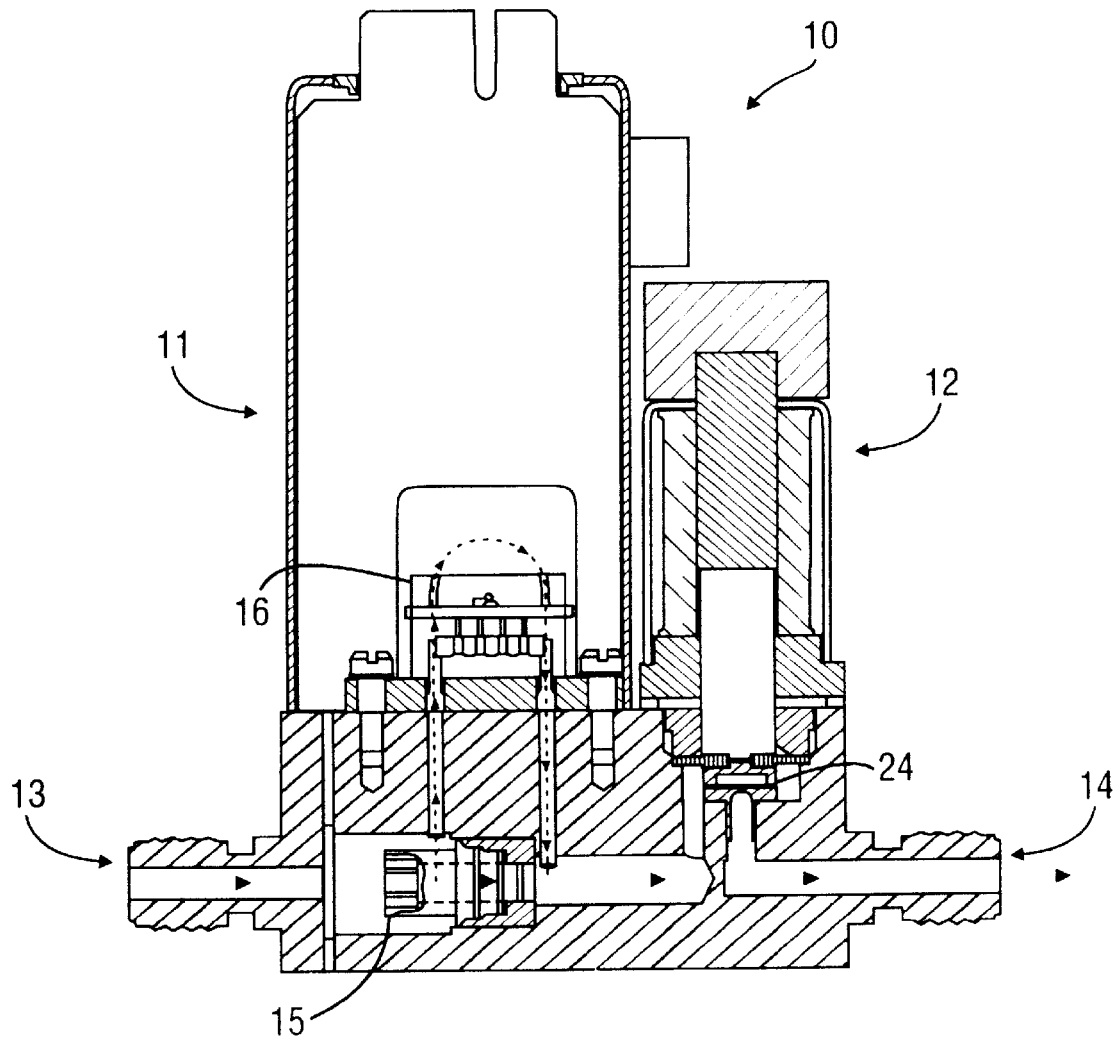
FIG. 2 shows a front elevation cross-section of the mass flow controller of FIG. 1, with the flow sensor portion shown enlarged for clarity.
Figure 3:
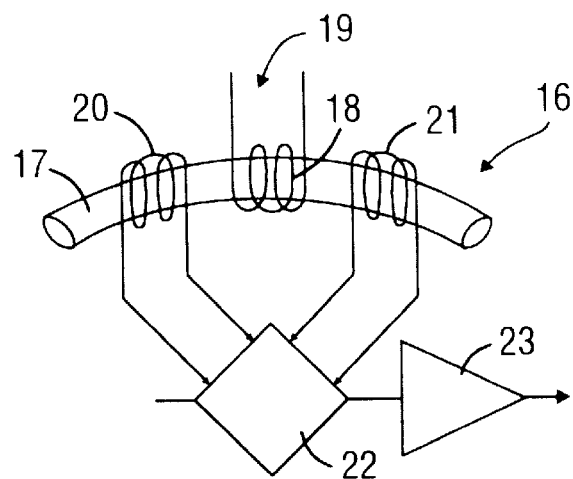
FIG. 3 illustrates a schematic view of the flow sensor portion of FIG. 2.

The operation of the exemplary mass flow controller 10 is illustrated in FIGS. 2 and 3. FIG. 2 shows the mass flow controller 10 in a cross section view. The mass flow meter portion 11 consists primarily of two components: a restrictor 15 and a flow sensor 16. The flow sensor portion 16 is shown in a schematic view in FIG. 3. Process gas enters the mass flow controller 10 through gas inlet 13, and is separated into two separate streams A and B. This separation of the gas inlet 13 flow into streams A and B is caused by the restrictor 15. The restrictor 15 performs a ranging function similar to a shunt resistor in an electrical ammeter, providing a pressure drop that is linear with flow rate. The resistance to flow results in a difference of gas pressure across the restrictor 15, which forces stream A to flow through the sensor. The gas that does not flow through the sensor (stream B) flows straight through the restrictor 15. Streams A and B are joined again at the opposite side of the restrictor 15.

The pressure difference caused by the restrictor 15 varies linearly with total flow rate, and the sensor has the same linear pressure difference versus flow relationship. The ratio of the flow through the restrictor 15 to the sensor flow remains constant over the range of the mass flow instrument. In other words, the ratio of flow stream A to the flow of stream B, or A/B, is constant or nearly so. The full scale flow rate for a mass flow instrument in accordance with the present invention is established by selecting a restrictor 15 with the correct pressure differential for the desired flow.

The flow sensor 16 comprises a narrow tube, preferably a thin walled stainless steel tube. A heater 18 is located on the midpoint of the sensor tube 17, with a precision power supply 19 providing a constant power heat input to the heater 18. The heater 18 transfers heat to the fluid present in the sensor tube 17. Upstream 20 and downstream 21 temperature sensing elements are located on either side of the heater 18, equidistant from the heater 18. The temperature sensing elements detect the amount of heat contained in the fluid. During no-flow conditions (flow=0), the fluid on either side of the heater 18 will be the same temperature, since the temperature sensing elements are the same distance from the heater 18. Consequently, the temperature difference ($\Delta T$) between the downstream temperature sensor 21 and the upstream temperature sensor 20 (T2-T1) is 0.

When fluid flows through the sensor tube 17, heat is carried away from the upstream temperature sensor 20 towards the downstream temperature sensor 21. The temperature difference between the downstream temperature sensor 21 and the upstream temperature sensor 20, $\Delta T$, is proportional to the mass flow of the fluid. A bridge circuit 22 interprets the $\Delta T$ and a differential amplifier 23 generates an electrical signal representing $\Delta T$, which is proportional to the gas mass flow rate.

The flow sensor described above illustrates a single example of a particular embodiment Other mass flow sensors work in a similar fashion, but are different. The most common alternative sensor design is a "two wire" design where sufficient current is applied to the sense windings to heat the sensor and take the place of the centrally located heating winding. Others measure flow by heating the tube to a constant temperature, or temperature gradient using the same type of self heating sense windings and maintaining a constant temperature or temperature gradient. Flow is sensed by measuring the electrical current or power required to maintain the temperature or gradient.

There are a number of other mass flow measurement technologies that depend on fluid properties to derive a flow measurement. These other methods include:

Hot wire: A wire made of a thermoresistive material such as platinum is placed in a flow stream. A constant power, constant current or constant temperature is maintained in the wire and the change in resistance, or power is used as an indication of flow.

$\Delta P$, P and T: This method measures the pressure drop ($\Delta P$), pressure (P) and temperature (T) across a flow restriction such as an orifice plate or laminar flow element. The change in pressure drop is related to flow.

Thermal Dispersion: This method uses a probe with two thermoresistive elements that is inserted into the flow stream. One element is maintained at a constant temperature above the other. The power required to maintain the temperature difference is related to the flow.

In the mass flow controller 10, the process mass flow is increased or decreased in the flow control portion 12 in response to a signal representing the set point. A "set point" generally refers to the desired flow rate and is expressed as a percentage of maximum flow in this disclosure. A signal representing the set point value is input to the mass flow controller 10 from an external source. The mass flow meter portion 11 provides the signal indicating the actual flow to the control portion which includes a control unit (not shown), a valve controller (not shown) and a valve 24. The control unit operates the valve drive in response to the signal representing mass flow in order to adjust the valve 24 until the actual flow measured in the mass flow meter portion 11 equals the set point value.

Figure 4:
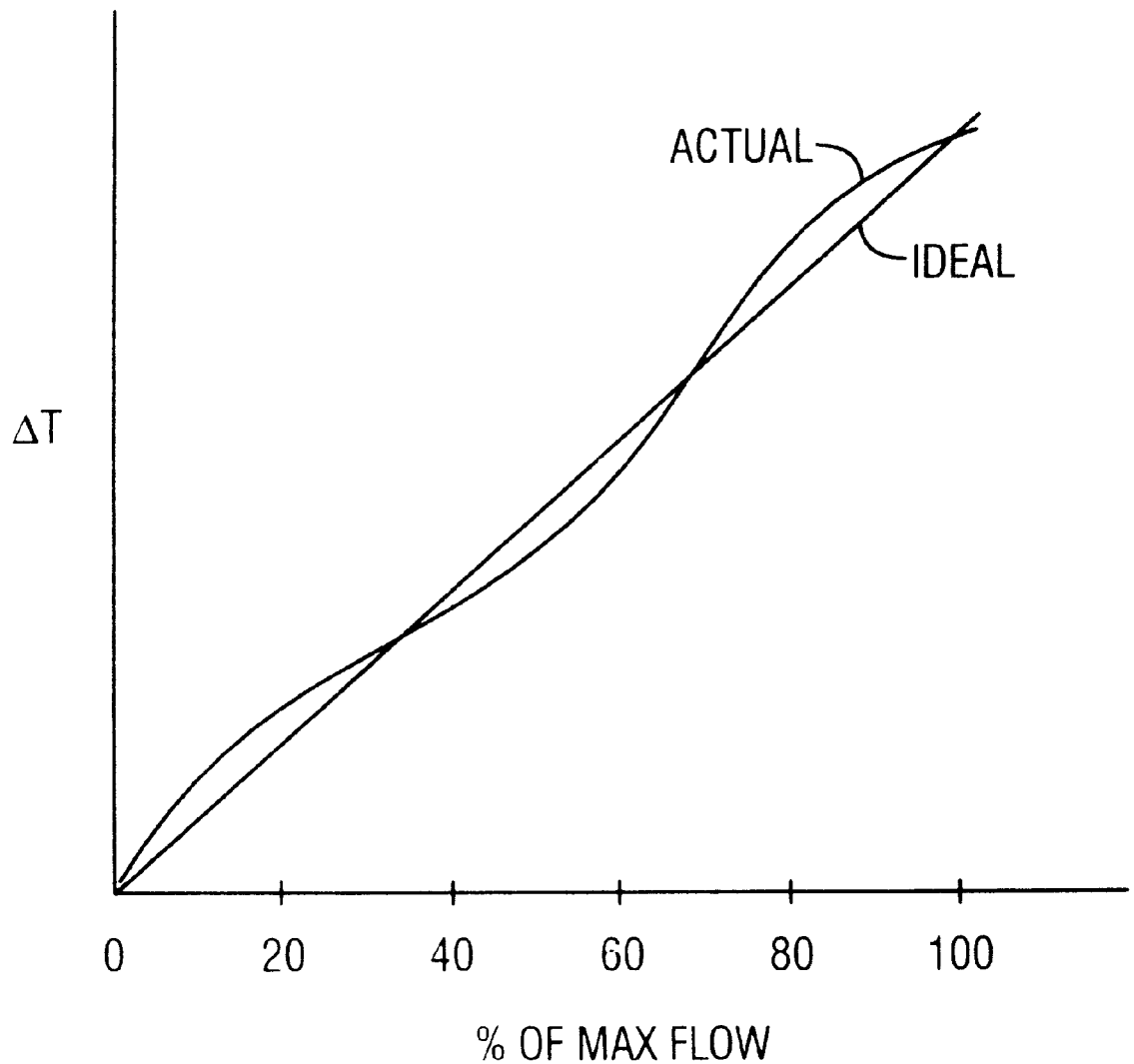
FIG. 4 illustrates an ideal and an exaggerated actual relationship between a mass flow instrument's raw $\Delta T$ signal and actual mass flow rate.

Ideally, the relationship between $\Delta T$ and mass flow would be linear across the mass flow instrument flow range for given process environment conditions, such as temperature and pressure conditions. For example, if a mass flow rate increase from 10 to 20 sccm results in a $\Delta T$ increase from 4 to 5, a mass flow rate decrease from 80 to 70 sccm would ideally result in a $\Delta T$ decrease from 11 to 10. It follows that the ideal relationship between the electrical signal representing $\Delta T$ and mass flow would also be linear. The line marked "ideal" in FIG. 4 illustrates this ideal relationship, showing flow rate as a percent of maximum flow on the graph x-axis verses $\Delta T$ on the y-axis.

In practice, the relationship between mass flow and the associated $\Delta T$ (and the signal representing $\Delta T$) is non-linear, and this relationship varies with each individual mass flow instrument due to variations in the construction of individual mass flow instruments. The line marked "actual" in FIG. 4 illustrates an exaggerated example of the actual relationship between $\Delta T$ and mass flow. To compensate for this non-linear relationship, each flow instrument must be individually calibrated. An illustrative process of calibrating a mass flow instrument consists essentially of determining the raw $\Delta T$ signal for a given mass flow at a plurality of points across the instrument's measuring range. A desired signal indicating actual mass flow is calculated corresponding to each raw $\Delta T$ signal. A function, F1, which maps the raw $\Delta T$ signal to the desired flow signal is then derived.

The derived function may then be loaded into the mass flow instrument's processor, whereby the raw signal is applied to the function and converted to the desired flow signal in real-time. Alternately, a calibration look-up table may be computed by applying a series of evenly spaced raw signal values to the function to compute the corresponding desired flow signal. The raw signal is then used to index the calibration table to determine the desired flow signal. If the actual raw ΔT signal falls between calibration table entries, the desired signal may be determined by interpolation.

Figure 5:
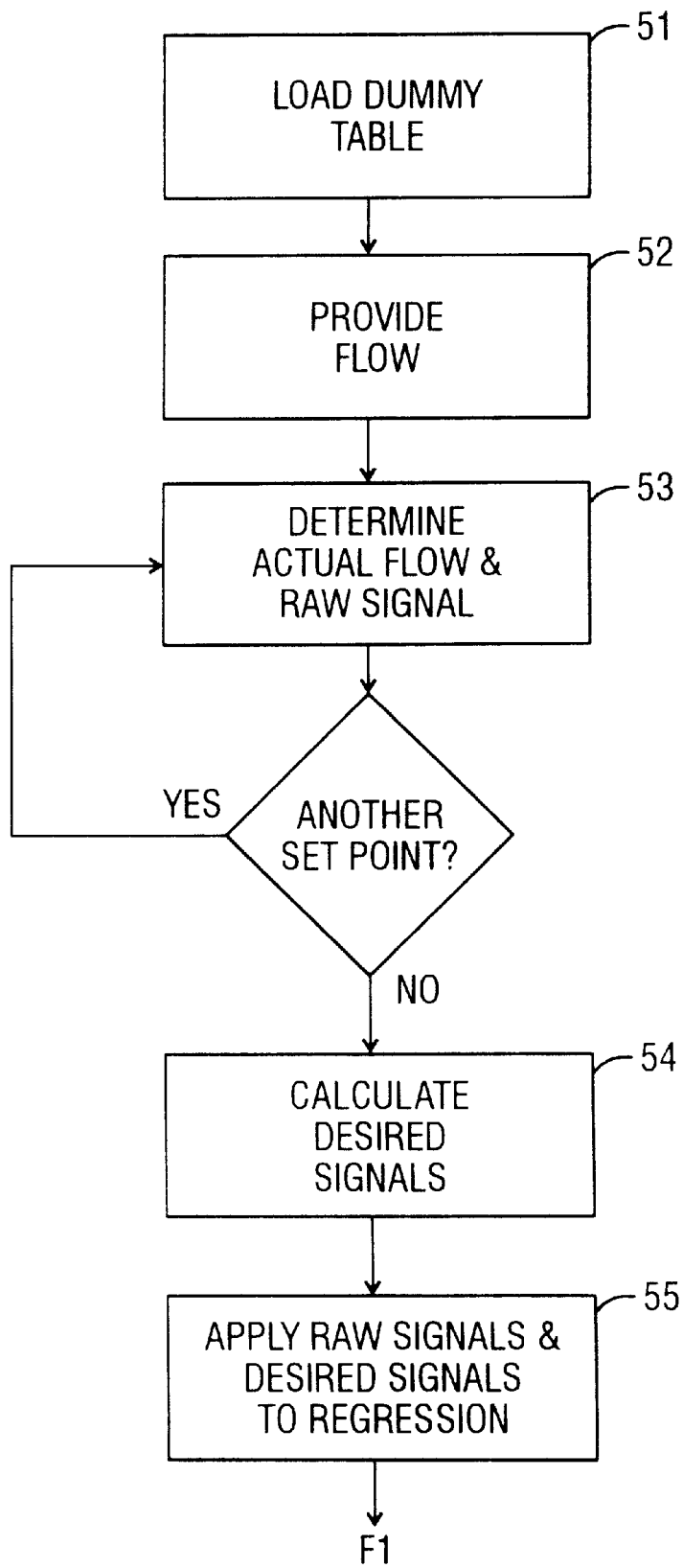
FIG. 5 is a flow chart illustrating the process of creating a calibration conversion function for a mass flow controller using a "safe" calibration gas.

FIG. 5 shows a flow chart illustrating in detail an exemplary process of calibrating a mass flow instrument. In step S1, a full scale "dummy" calibration table is loaded into the memory of the instrument to be calibrated, which allows the instrument to function during the calibration process. The dummy table is a linear table that is close to the desired calibration table, containing the raw ΔT full scale signal value and the adjusted signal values which represent calibration fluid flow. The dummy table may be derived from past experience in calibrating similar instruments. Other calibration table arrangements may also be used, as well as loading a conversion function into the instrument's memory. When fluid flows through the mass flow instrument, a raw ΔT signal is produced that relates to mass flow. The mass flow instrument's processor uses the raw signal to index the dummy calibration table and output a signal indicating flow. In step S2, fluid is flowed through the mass flow instrument, and in step S3 of FIG. 5, the raw signal output by the instrument and the actual flow rate is determined. Steps S2 and S3 are repeated at several predetermined points over the instrument's flow range at specified operating conditions. For an embodiment of the mass flow controller 10 of the present invention, measurements are made at 13 different points over the instrument's measuring range for calibration purposes. In step S4, a desired flow signal corresponding to the measured flow rate is calculated. The measured raw output signals and the corresponding desired signals are applied to a regression algorithm to derive the F1 calibration function in step S5.

The exemplary process of FIG. 5 is illustrated by the following example using hypothetical data. The mass flow instrument being calibrated in the example is a mass flow controller connected to a source of fluid and a calibration standard or primary flow meter so actual flow can be determined. Flow rates are expressed in standard cubic centimeters (sccm). The mass flow controller of this example requires a calibration table containing 25 evenly spaced entries. The raw signal values which correspond to entries in the calibration table are determined by dividing the raw ΔT full scale signal value by 25. The mass flow controller being calibrated in this example is a digital instrument, so the raw ΔT signal is digitized and expressed in counts, which are proportional to the raw signal voltage. The raw signal ranges from 0 to 40,000 counts, with 40,000 counts representing 120% set point. Thus, the 25 raw signal values for the dummy calibration table are in 1,600 count increments (40,000/25) ranging from 1,600 to 40,000. In the mass flow controller being calibrated in this example, only the raw signal value representing 120% set point (40,000 counts) is loaded into the mass flow controller's memory. The instrument's processor performs the function of dividing the raw signal values into evenly spaced indices. Additionally, the 25 evenly spaced desired flow signals which approximate the anticipated desired signals are loaded into the mass flow controller's memory in step S1 of FIG. 5. The full scale flow rate of the mass flow controller is now coarsely adjusted.

Calibration fluid is allowed to flow through the mass flow instrument at its 100% set point. The raw ΔT full scale signal value in the dummy calibration table is adjusted until the actual flow rate is within 2% of the desired 100% flow rate (actual flow is determined by the attached calibration standard or primary flow meter). The object of this step is to arrive at a full scale flow rate which is near the desired full scale flow. For the hypothetical mass flow controller of this example, the full scale, or 100% flow is 461 sccm. This is an iterative process of successive approximation, and for this example, results in a raw ΔT full scale signal value of 38,279 counts representing a set point of 120% of full scale flow. The dummy calibration indices are now spaced in 1,531 count increments (38,279/25).

In step S2 of FIG. 5, gas is flowed through the mass flow controller. Actual flow rates and corresponding raw signal values are then collected in step S3 at 13 set points. Additionally, the temperature reported by the mass flow controller at each set point is collected so that the instrument may be compensated for temperature. Other variables, such as pressure, may also be noted during calibration for additional compensation.

The raw signal and actual flow data for each set point value (% of full scale flow) are displayed in Table 1 below.

TABLE 1

| set point (% of max) | raw signal (counts) | actual flow (sccm) |
| --- | --- | --- |
| 5 | 1764 | 21.777 |
| 10 | 3542 | 43.877 |
| 20 | 7091 | 87.979 |
| 30 | 10628 | 132.416 |
| 40 | 14177 | 177.105 |
| 50 | 17732 | 222.278 |
| 60 | 21278 | 268.052 |
| 70 | 24822 | 314.955 |
| 80 | 28375 | 363.068 |
| 90 | 31918 | 412.486 |
| 100 | 35455 | 463.538 |
| 110 | 39009 | 516.584 |
| 120 | 42540 | 571.588 |

A calibration table will be constructed which indicates the desired signal (denoting flow) for a given raw output signal. Each actual flow rate from Table 1 is transformed into a desired signal for that flow rate in step S4. The desired signal is calculated by determining the percentage of full scale flow for the actual flow rate to be converted, then applying this percentage to the desired full scale signal value. For the mass flow controller of this example, 10,000 counts represents the full scale, or 100% flow rate. The desired signal calculation is expressed by the following equation:

$$\text{DesiredSignal}_n = (\text{ActualFlow}_n / \text{DesiredFullScaleFlow}) * 10{,}000$$

Thus, the desired signal expressed in counts for the 5% set point value is calculated using the actual flow for the 5% set point from Table 1 and the desired full scale, or 100% flow for this mass flow controller of 461 sccm as follows:

$$\text{DesiredSignal}_{5\%} = (21.777/461) * 10{,}000 = 472.386$$

The actual flow rates and the corresponding desired flow signals are displayed in Table 2 for each of the 13 set point values from Table 1.

TABLE 2

| set point (% of max) | actual flow (sccm) | desired signal (counts) |
| --- | --- | --- |
| 5 | 21.777 | 472.386 |
| 10 | 43.877 | 951.779 |
| 20 | 87.979 | 1908.438 |
| 30 | 132.416 | 2872.364 |
| 40 | 177.105 | 3841.757 |
| 50 | 222.278 | 4821.649 |
| 60 | 268.052 | 5814.577 |
| 70 | 314.955 | 6831.996 |
| 80 | 363.068 | 7875.662 |
| 90 | 412.486 | 8947.636 |
| 100 | 463.538 | 10055.054 |
| 110 | 516.584 | 11205.727 |
| 120 | 571.588 | 12398.872 |

The raw signals and the computed desired signals are used to compute an equation which maps a raw signal to the desired flow signal. In the current example, a fourth order equation is derived for this purpose. The raw signal is applied as the input (x) and the desired signal is applied as the output (y) of a polynomial regression. There are many polynomial regression algorithms which would be suitable for deriving this equation. In an exemplary embodiment of the present invention, the regression algorithm known as LU Decomposition is used to derive the following F1 equation:

$$y = f(x) = 4.60755 \times 10^{-17} x^4 + 1.43026 \times 10^{-11} x^3 - 2.14782 \times 10^{-7} x^2 + 0.27132 x - 6.5937$$

For the mass flow controller of the present example, 25 raw signal values are applied to the above F1 equation as the x input to derive 25 corresponding desired signals, which are the y outputs. As with the dummy table initially loaded in the mass flow controller in step S1 of FIG. 5, the 25 raw signal indices are in evenly spaced increments determined by dividing the raw $\Delta T$ full scale signal value by 25. The raw $\Delta T$ full scale signal value from Table 2 is 42,540 counts (120% set point), so the 25 raw signal indices are in increments of 42,540/25, or 1,701.60 counts. Each of these 25 raw signal values are applied to the equation derived above to calculate the corresponding calibration table entries, which are the desired signals indicating mass flow. The example calibration table values are displayed in Table 3.

TABLE 3

| index | Raw signal | desired signal |
| --- | --- | --- |
| 1 | 1702 | 455 |
| 2 | 3403 | 915 |
| 3 | 5105 | 1375 |
| 4 | 6806 | 1835 |
| 5 | 8508 | 2295 |
| 6 | 10210 | 2757 |
| 7 | 11911 | 3220 |
| 8 | 13613 | 3685 |
| 9 | 15314 | 4152 |
| 10 | 17016 | 4622 |
| 11 | 18718 | 5096 |
| 12 | 20419 | 5574 |
| 13 | 22121 | 6056 |
| 14 | 23822 | 6543 |
| 15 | 25524 | 7036 |
| 16 | 27226 | 7535 |
| 17 | 28927 | 8041 |
| 18 | 30629 | 8554 |
| 19 | 32330 | 9074 |
| 20 | 34032 | 9604 |
| 21 | 35734 | 10142 |
| 22 | 37435 | 10690 |
| 23 | 39137 | 11248 |
| 24 | 40838 | 11818 |
| 25 | 42540 | 12399 |

This calibration table replaces the dummy table in the memory of the mass flow controller. The value 42,540 replaces the raw $\Delta T$ fill scale signal value determined during the coarse calibration above. The raw signal representing $\Delta T$ is used by the mass flow controller to index the calibration table and determine the proper desired signal which represents actual flow. If the raw signal value does not correspond to an index in the calibration table, the desired signal is determined by interpolation. The mass flow controller reads the raw signal value, and then determines which two points in the calibration table the reading falls between. The desired signal is derived by calculating the slope of the line between the two points and determining the distance from a the lower point in the table to the reading, then calculating the desired signal according to the following equation:

$$\text{DesiredSignal} = (\text{Slope} \ast \text{distance}) + \text{lower point}$$

To illustrate the interpolation process, assume that the mass flow controller in the current example takes a raw signal reading of 7,265 counts from the sensor analog to digital converter. The calibration table displayed in Table 3 above is contained in the mass flow controller's memory. The raw signal of 7,265 points falls between index points 4 and 5 of Table 3. Slope is defined as the change in y (the desired flow signal) with respect to the change in x (the raw signal value). Hence, the slope of the line between points 4 and 5 is calculated as follows:

$$\text{Slope} = (y_2 - y_1)/(x_2 - x_1) = (2295 - 1835)/(8508 - 6806) = 270$$

The distance of the raw signal reading from the lower signal point (index 4) is 459 counts (7265-6806). The desired signal representing flow then can be calculated as follows:

$$\text{DesiredSignal} = (\text{Slope} \ast \text{distance}) + \text{lower point} = (0.270 \ast 459) + 1835 = 1959 \text{ counts}$$

Thus, 1959 counts is the desired signal representing actual mass flow. Full scale flow is represented by 10,000 counts, so the actual flow rate is 19.59% of maximum flow. The maximum flow rate for the example mass flow controller is 461 sccm, so the raw signal of 7,265 counts represents mass flow of 90.3 sccm (461*0.1959).

A similar process is used to calibrate a mass flow meter according to the present invention. A mass flow meter in accordance with this invention is identical to the exemplary mass flow controller, except the mass flow meter does not contain the flow control portion 12. To calibrate a mass flow meter, an external valve is connected to the gas outlet 14 of the mass flow meter, and the process described above in association with FIG. 5 and the corresponding example is performed on the combination of the mass flow meter and external valve to generate the F1 function for the mass flow meter.

Ideally, this calibration process would be performed using the actual process gas to be measured. Calibrating with actual process gases, however, is impractical or impossible for gases used in many industrial processes, especially processes in the semiconductor manufacturing industry, due to the hazardous nature of the process gases. In addition to being potentially dangerous to personnel and their surroundings during the calibration procedures, many process gases are environmentally unfriendly. Moreover, many of the process gases may actually cause damage to the mass flow instruments subsequent to the calibration process. For example, if a gas such as chlorine is exposed to moisture, as when the instrument is exposed to air, hydrochloric acid results. If a mass flow instrument is calibrated with chlorine and traces of the gas remain in the instrument following calibration, hydrochloric acid may form in the instrument when it is exposed to air prior to installation, potentially causing significant damage.

To compensate for these problems, mass flow instruments may be calibrated according to the process described above with an inert "safe" gas such as nitrogen to correct for the instrument's inherent non-linearity. In known systems, the manufacturer must then derive a conversion constant or theoretical conversion function to convert the instrument's calibration from the safe calibration gas to the process gas.

As discussed in Background of the Invention section herein above, calculating a conversion constant based on relative theoretical properties of the calibration gas and the process gas has proven unsatisfactory. The solution provided by the present invention uses actual process gases to create a second empirically derived function, F2, which maps the desired signal indicating flow of the safe gas (based on F1) to an ideal signal indicating flow of the process gas.

In an exemplary embodiment of the present invention, a mass flow instrument is manufactured to measure the flow of a process gas. This instrument is calibrated using a safe gas and a calibration table is derived. Each desired signal from the calibration table is applied, element by element, to the empirically derived function F2 to derive a new calibration table which is then loaded into the mass flow instrument's memory. Alternately, other implementations of the invention are envisioned wherein F1 and F2 are combined into a third empirically derived function which is loaded into the mass flow instrument's memory. This empirically derived function may also be a fourth order polynomial. The processor can then read the raw $\Delta T$ signal and convert it to the desired flow signal representing flow of the process gas in real time.

Further, empirically derived calibration tables or conversion functions for multiple process gases or flow conditions may be loaded into the processor's memory of the current invention. In an exemplary embodiment, 10 different calibrations may be stored in memory. This allows the mass flow instrument to be used in processes requiring measurement of multiple gases. With prior art mass flow instruments, a separate instrument was installed for each type of gas flowing in the process, and re-calibration was required if flow conditions, such as the full scale flow rate, changed. The ability to store multiple calibrations significantly reduces installation costs, reducing the number of instruments required, reducing installation costs, simplifying maintenance procedures, etc.

Figure 6:
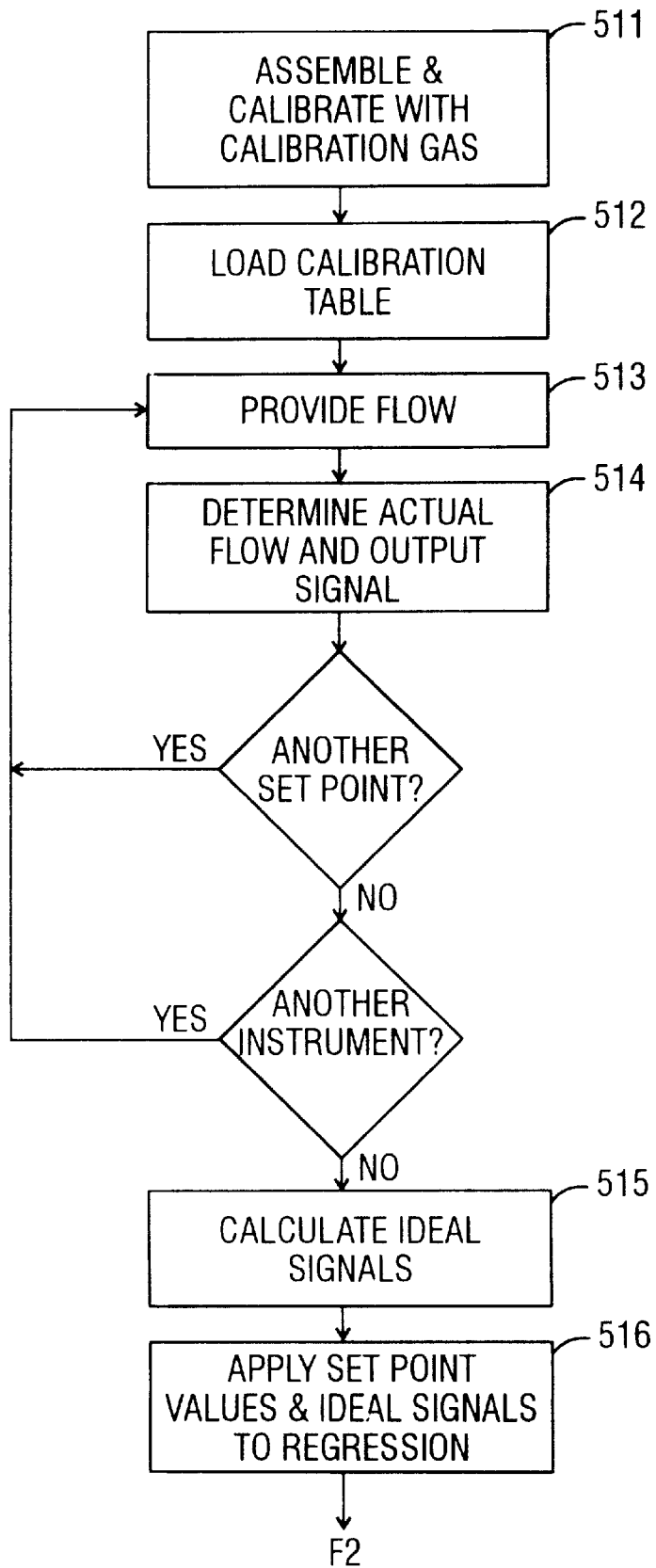
FIG. 6 is a flow chart illustrating a process of creating an empirical conversion function to convert a mass flow instrument indicating calibration gas flow to indicating actual process gas flow.

FIG. 6 illustrates the process steps for creating the empirically derived conversion function F2 for an actual process gas. In step S11 of FIG. 6, one or more mass flow instruments are assembled and calibrated with an inert calibration gas according to the process described above in conjunction with FIG. 5. These mass flow instruments are manufactured for calibration purposes only—in other words, these instruments will not be used for actual process measurement and control. For purposes of this disclosure, the mass flow instruments assembled solely for the purpose of creating an actual gas function are referred to as "calibration" mass flow instruments, while instruments assembled for use in an actual process are referred to as "process" mass flow instruments. Further, the safe gas used for calibration purposes is referred to as the "calibration gas" and the actual gas to be measured in the process is referred to as the "process gas."

The calibration table derived using the calibration gas data is loaded into the memory of the calibration mass flow instrument in step S12. The calibration process is then repeated using the actual process gas, except rather than determining the actual mass flow and raw output signal, only calibration gas flow signal and actual flow need to be determined. The process gas flow is provided to the calibration instrument in step S13 and the actual flow and calibration gas flow signal for each set point is determined in step S14. This process is repeated at predetermined points across the instrument's measuring range. As with the process associated with FIG. 5, a preferred embodiment performs steps S12 and S13 at 13 different set points. In one embodiment of the invention, steps S12 through S14 are performed on a predetermined number of instruments and the actual flow for each set point is averaged. Ideal signals indicating actual flow of the process gas are then computed in step S15. Finally, in step S16, the actual output signals and the calculated ideal flow signals are correlated to empirically derive a conversion function, F2.

As discussed above, calibrating a mass flow instrument with the actual process gas to be measured is often impractical or impossible, especially in a typical manufacturing setting. It is therefore desirable to keep the hazardous process gases and the associated calibration mass flow instruments completely separate from the process mass flow instruments and standard calibration facilities and gases.

Figure 7:
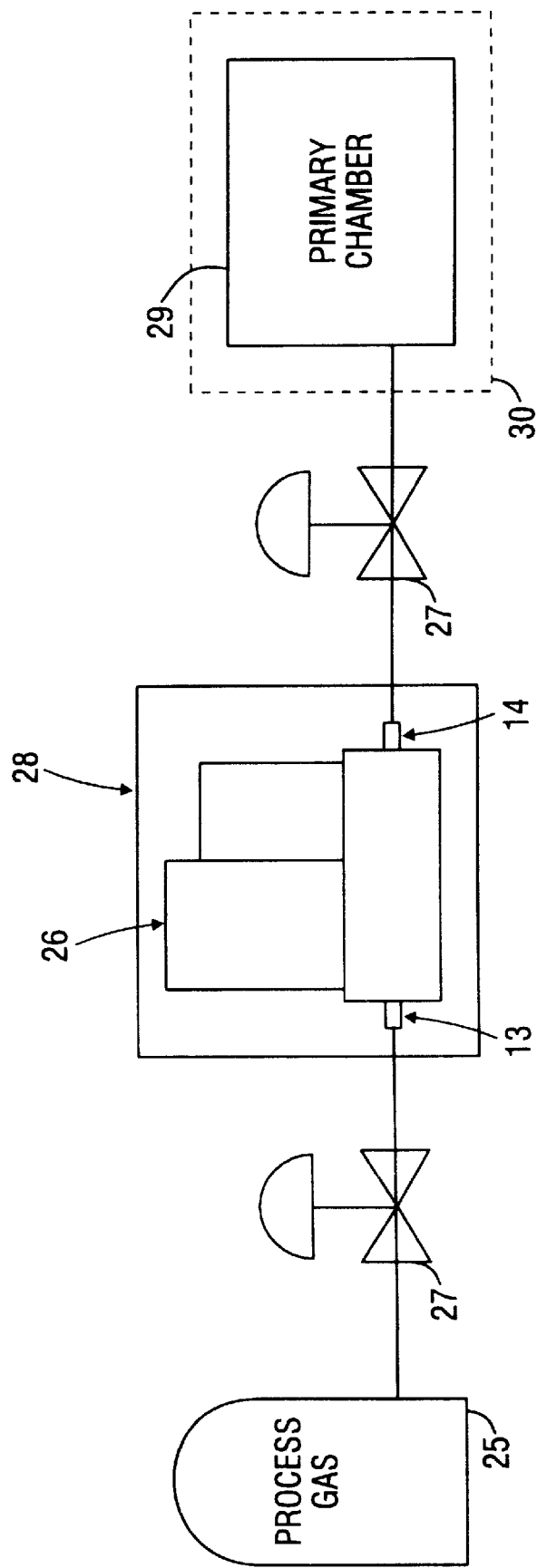
FIG. 7 illustrates a simplified schematic of a system used for calibrating a mass flow instrument with a process gas.

For an exemplary application of the process described in conjunction with FIG. 6, a special facility is used for calibrating the mass flow instruments with the often dangerous process gases. FIG. 7 illustrates a simplified schematic of a flow system for calibrating a calibration mass flow instrument with a process gas in accordance with the present invention. A container 25 holds the process gas, and the gas inlet 13 of the calibration mass flow instrument 26 to be calibrated is connected to the container 25 through a shut-off valve 27. The calibration mass flow instrument 26 is contained in a temperature controlled test chamber 28, which allows instruments to be tested at various temperatures.

The mass flow instrument gas outlet 14 is coupled via another shut-off valve 27 to a primary chamber 29, which is a known volume. The primary chamber 29 is kept in a temperature controlled bath 30, where temperature controlled water circulates through coils in the bath to eliminate temperature gradients in the primary chamber 29. The shut-off valves 27 provide isolation of the calibration mass flow instrument from the remaining system elements, and they also provide a means to purge the mass flow instrument prior disconnecting it from the system.

The actual fluid mass flow rates for calibrating the calibration mass flow instruments with the hazardous process gas may be determined using a method commonly known as the rate of rise method. This method uses the rate of the pressure rise in a rigid evacuated chamber (primary chamber 29) to determine the flow rate, rather than using the volumetric flow standard as is traditionally used. The flow rate is derived by knowing the pressure and temperature inside the chamber which has a known volume. This method is used in one application of the present invention. Other methods to safely and accurately determine the actual mass flow of a hazardous process gas for calibration purposes are envisioned, including:

Coriolis type mass flow meter: This type of instrument measures flow by detecting changes in the characteristics of a vibrating tube caused by flow through the tube.

Volumetric Prover: This class of instruments uses a well known volume (typically a cylinder) with a movable element (piston). The fluid enters one end and causes the piston to move. The fluid stays a relatively constant pressure and temperature as the piston moves. The flow is determined by the velocity of the piston. An example of this type of instrument is the Brooks Vol-U-Meter.

ΔP, P and T: This method can also be used as a flow standard. Typically a critical flow nozzle is used as a flow restriction.

Gravimetric: Flow is collected in a container which is weighed. The flow is determined by the rate of weight gain of the container.

Ratiometric: Two fluids are required for this technique, A and B. One Fluid, A with a known flow rate. The other fluid, B is mixed with the known flow. The unknown flow of the fluid B is determined by the concentration of B in A of the mixed stream as the concentration will be proportional to the flow rate of B.

The volume in the chamber must be precisely known for the rate of rise technique. The pressure and temperature may be measured using standard instrumentation. For a specific application of the present invention, the volume of the chamber was determined by filling a piston-type prover with a non-reactive gas such as nitrogen. A preferred piston-type prover is a Brooks Instrument Model 1078 Vol-U-Meter. The gas was discharged from the Vol-U-Meter into the primary chamber 25 and the resulting pressure and temperature changes were measured. Pressure and temperature readings of the Vol-U-Meter and the primary chamber 25 were taken prior to and following flowing the gas into the chamber.

An RTD was used to calculate temperature in the Vol-U-Meter, and a Ruska model 6200 Portable Pressure Gage was used to measure the pressure inside the Vol-U-Meter. The pressure inside the Vol-U-Meter was measured directly by the Ruska Pressure Gage rather than measuring the ambient pressure and adding the differential pressure of the piston. MKS model 120AA-00010RBJ (0–10 Torr) and model 120AA-00100RBJ (0–100 Torr) pressure transducers were used to measure the pressure in the primary volume, and temperature measurements in the primary volume were made by Omega model RTD-809 surface probes. The temperature of the primary chamber 25 was held constant since it was located in the temperature controlled bath 26.

The volume displaced by the piston can be directly related to the volume of the unknown chamber by the following equation:

$$V1 = V_{del} * \frac{P_s}{T_s} * \frac{T1_c * T2_c}{(T1_c * P2_c - T2_c * P1_c)}$$

where
V1=Unknown volume of the chamber
$V_{del}$=Displaced volume of the piston
$P_s$=Standard Pressure
$T_s$=Standard temperature
$T1_c$=Beginning temperature in the chamber
$T2_c$=Ending temperature in the chamber
$P1_c$=Beginning pressure in the chamber
$P2_c$=Ending pressure in the chamber This equation is derived as follows:
Definitions
Vvol_1=Starting volumeter volume (liters)
Vvol_2=Ending volumeter volume=0
Tvol=Temperature of the gas in the volumeter (C)
Pvol=Absolute pressure in the volumeter (Pascals)
Vdel=Delivered volume, standard liters (OC, 101.325 kPa)
Ts=Standard Temperature=OC (273.15K)
Ps=Standard Pressure=1 atm (101.325 kPa)
P1v=Pressure of V1 at beginning of run (Torr)
P2v=Pressure of V1 at end of run (Torr)
T1v=Temperature of V1 at beginning of run (K)
T2v=Temperature of V1 at end of run (K)
V1=volume in the primary chamber (liters)
Conversions
Torr=133.3224 Pascals
C=273.15K
Assumptions
1—The mass displaced from the Vol-U-Meter (delivered volume) is the mass gained in the primary chamber, VI.
2—The calibration gas (nitrogen) follows the Ideal Gas Law.
Derivation
Vdel=(Vvol_1-Vvol_2)*Pvol/Ps*Ts/Tvol
Vdel=(Vol_1-Vol_2)*Pvol/101.325*273.15/Tvol
m_del=Vdel*Rho_s (conversion of standard volume to mass units)
Rho_s=Ps/(R*Ts) (definition of standard density)
PV=mRT (perfect gas law)
m=PV/RT
m_del=P2v*V1/(R*T2v)-P1v*V1/(R*T1v) (conservation of mass)
Vdel*Rho_s=P2v*V1/(R*T2v)-P1v*V1/(R*T1v)
Vdel*Ps/(R*Ts)=P2v*V1/(R*T2v)-P1v*V1/(R*T1v)
Vdel*Ps/Ts=P2v*V1/(T2v)-P1v*V1/(T1v) (R cancels)
Vdel*Ps/Ts=V1*(T1v*P2v-T2v*P1v)/(T1v*T2v)
V1-Vdel*Ps/Ts*(T1v*T2v)/(T1v*P2v-T2v*P1v)
If T1v=T2v (call this % v) the equation reduces to:
V1=Vdel*Ps/Ts*Tv/(P2v-P1v)

The flow system described above in conjunction with FIG. 7 is applied to the process of FIG. 6 as follows. In step S13, the process gas flows from container 25 through the calibration mass flow instrument 26 to the primary chamber 30. A raw ΔT signal is generated by the calibration mass flow instrument 26 which is used to index the calibration table derived in step S11. A signal is output based on the corresponding desired signal from the calibration table which represents flow of the calibration gas. Since the volume of the primary chamber 30 is known, the actual flow rate for the given set point is determined based on the temperature and rate of rise of pressure inside the primary chamber 29 in step S14. This process is repeated at a series of predetermined set points across the instrument's flow range.

For the device and method of an embodiment of the present invention, three mass flow controllers are used for this purpose and the actual process gas flow rates are averaged. The ideal signal representing flow of the process gas is calculated based on the average values of the actual flow in step S15, and empirically derived conversion function F2 is computed by applying the calibration gas flow signals as the x inputs and the ideal flow signals as the y inputs to a regression algorithm. In an exemplary application of the invention, empirically derived conversion function F2 is a fourth-order polynomial computed using the regression algorithm known as LU Decomposition.

Since the process gases used for calibration are not altered or contaminated by the calibration process, they may be compressed and put back in their original container after flowing through the mass flow instrument being calibrated. In the case of a low vapor pressure gas such as tungsten hexafluoride (WF6) the gas is cryogenically cooled to refill the container.

The following example using hypothetical data further illustrates the procedure described in conjunction with FIG. 6. A calibration mass flow controller is first calibrated with an inert calibration gas, nitrogen. A calibration table is derived and loaded into the controller's memory, then the mass flow controller is calibrated with the process gas. As with the calibration gas procedure, the process gas is flowed through the calibration mass flow controller at 13 set points across the instrument's measuring range in an exemplary embodiment. For this example, assume the process gas is argon. The actual flow rate of the process gas is collected for each of the 13 set points and displayed in Table 4:

TABLE 4

| set point (% of max) | actual flow |
| --- | --- |
| 5 | 31.81383 |
| 10 | 64.0121 |
| 20 | 128.103 |
| 30 | 19.8784 |
| 40 | 256.2823 |
| 50 | 320.8488 |
| 60 | 385.7537 |
| 70 | 448.294 |
| 80 | 513.8796 |
| 90 | 579.9995 |
| 100 | 650.572 |
| 110 | 715.3647 |
| 120 | 784.4412 |

This process may be repeated on more than one calibration mass flow instrument and the results averaged. For one application of the calibration method of the present invention, the process gas calibration procedure is repeated on three mass flow controllers. The average values would then be used to derive the new calibration table. The table of actual flow rates is then converted to a table of ideal flow signals using:

Ideal Flow Signal$_n$=(Process Gas Actual Flow$_n$/Process Gas FullScaleFlow)*10,000

The object of this calibration process is an empirically derived conversion function F2, which maps the flow signal of a mass flow controller calibrated with nitrogen to a flow signal for the process gas. If the mass flow controller is operating properly, the set point is identical to the flow signal (since it was previously calibrated with the calibration gas, nitrogen). Thus, the set points used to collect the process gas data can be considered the nitrogen flow signal (when multiplied by 100 to bring the 100% flow signal to 10,000 counts):

Calibration Gas Flow Signal$_n$=Set point$_n$*100

The calibration gas flow signal and the calculated ideal signal for each of the 13 set points are displayed in Table 5.

TABLE 5

| calibration gas signal | ideal signal |
| --- | --- |
| 500 | 489.0132 |
| 1000 | 983.7497 |
| 2000 | 1967.499 |

TABLE 5-continued

| calibration gas signal | ideal signal |
| --- | --- |
| 3000 | 2949.38 |
| 4000 | 3939.339 |
| 5000 | 4931.795 |
| 6000 | 5929.455 |
| 7000 | 6890.766 |
| 8000 | 7898.888 |
| 9000 | 8915.224 |
| 10000 | 10000 |
| 11000 | 10995.93 |
| 12000 | 12057.71 |

The empirically derived conversion function F2 equation is generated using the same regression algorithm used to create the F1 equation, which maps the raw output signal values to flow signals indicating mass flow of the calibration gas, nitrogen. For the empirically derived conversion function F2 equation, the equation output (y) is the ideal flow signal indicating the process gas flow (in this example, argon) when the input (x) is the calibration gas flow signal (set point*100). The empirically derived conversion function F2 equation for this example is as follows:

$$y=g(x)=-1.7092*10^{-13}x^4+4.4946*10^{-9}x^4-3.5451*10^{-5}x^2+1.0885x-5.2371$$

This empirically derived conversion function F2 is applicable to mass flow instruments assembled with the same restrictor size as the mass flow controllers used for the process gas calibration procedure which have been calibrated for the same calibration gas full scale, or 100% flow rate (461 sccm of nitrogen for this example).

The empirically derived conversion function F2 equation (g(x)) maps the nitrogen flow signal into the flow signal for the process gas, and the original calibration equation for a specific process mass flow controller, F1 (f(x)), maps the raw sensor signal into nitrogen flow signal. This implies that the mapping from the raw sensor signal to the process gas signal is:

Process Gas Flow Signal=gf(x))

If the desired full scale, or 100% flow rate of a process mass flow controller was 650.572 sccm of argon, then the process mass flow controller would be calibrated for 461 sccm of nitrogen and each of the 25 calibration table points would be processed through g(x). The results would be loaded into the calibration table in place of the nitrogen table. However, an order for an argon mass flow controller having a full scale flow of precisely 650.572 sccm would be very unusual. Therefore, the application of the two equations to achieve full scale flow rates other than the exact full flow rate of the process gas calibration procedure will be discussed next.

The empirically derived conversion function F2 is useful for a mass flow controller with a specific restrictor which has been calibrated with a calibration gas (usually nitrogen) at specific conditions of full scale flow and inlet pressure. The restrictor involved is useful over a limited range of process gas full scale flow rates. The following example is a continuation of the above examples, applying the illustrated calibration process to a mass flow controller with a desired full scale flow rate of 600 sccm of argon. The example assumes that the desired full scale, or 100% flow rate (600 sccm of argon) is within the normal range for the restrictor of the example mass flow instrument. The desired result of this example is a calibration table for a process mass flow controller which will indicate 100% when an argon flow rate of 600 sccm is established. It is further desirable to have the calibration table contain values that will allow flow rates as high as 120% of full scale to be correctly indicated. The empirically derived conversion function F2 equation arrived at in the example above indicates 100% when the flow rate of argon is 650.572 sccm. The empirically derived conversion function F2 accepts as its input the output from the specific process mass flow controller's nitrogen F1 equation. First, it must be determined what calibration gas flow signal input to the empirically derived conversion function F2 will result in the ideal flow signal output representing 120% of the full scale flow, or 720 sccm of argon (120% of 600 sccm).

Successive approximation is used to find the required input to the empirically derived conversion function F2. The ideal output is calculated by dividing the desired 120% flow value by the actual process gas full scale, or 100% flow value from the process gas calibration procedure. This result is then applied to the full scale flow signal value of 10,000 counts. For this example, the calculation is:

(720/650.572)*10000=11067.2

Inputs are applied iteratively until a value very near that desired is achieved. The input to the empirically derived conversion function F2, g(x), which results in an output of approximately 11067.2 is 10918.

The input to the empirically derived conversion function F2 is the output of the mass flow controller F1 equation, f(x). The same successive approximation technique is now applied to f(x) to determine the input raw signal value which results in an output signal of 10,918. The input value is 38,143 raw sensor counts This value represents approximately 120% of full scale flow. The process mass flow controller F1 equation, f(x), is used to create a new nitrogen table containing 25 raw signal values in increments of 38,143/25, or 1525.72 counts. Assume for the purposes of this example, that the process mass flow controller F1 equation is the same as the F1 equation derived for the calibration mass flow instrument above. Each of these 25 values is applied to F1 to calculate corresponding signals representing mass flow of the calibration fluid, nitrogen. Each of these corresponding nitrogen flow signals (output from F1) is then applied as an input to the empirically derived conversion function F2 to convert the signals representing nitrogen flow to signals representing flow of the process gas, argon.

The resulting calibration table, however is an "intermediate" calibration table, because it is still based on the argon 100% flow being 650.572 sccm (empirically derived conversion function F2 was derived based on the full scale flow of 650.572 sccm). It must be scaled by the ratio of the empirically derived conversion function F2 full scale value to the desired argon fill scale. Each entry of the final calibration table is calculated as follows:

Cal Table$_n$=Intermediate Table$_n$*(650.572/600)

Table 6 shows the raw signal count values based on the 38,143 full scale count (120% set point), along with results of applying these values to F1, then applying the F1 output to empirically derived conversion function F2, and finally, adjusting the empirically derived conversion function F2 output from 650.572 full scale flow to 600 sccm fill scale flow.

TABLE 6

| index | raw signal | F1 | F2 | adjust |
|---|---|---|---|---|
| 1 | 1525.72 | 406.916 | 432.2083 | 468.6377 |
| 2 | 3051.44 | 819.733 | 865.8965 | 938.8801 |
| 3 | 4577.16 | 1,232.173 | 1289.997 | 1398.727 |
| 4 | 6102.88 | 1,644.555 | 1708.17 | 1852.146 |
| 5 | 7628.60 | 2,057.204 | 2119.865 | 2298.541 |
| 6 | 9154.32 | 2,470.453 | 2528.443 | 2741.557 |
| 7 | 10680.04 | 2,884.639 | 2936.105 | 3183.579 |
| 8 | 12205.76 | 3,300.106 | 3342.004 | 3623.691 |
| 9 | 13731.48 | 3,717.203 | 3749.115 | 4065.115 |
| 10 | 15257.20 | 4,136.286 | 4158.344 | 4508.837 |
| 11 | 16782.92 | 4,557.718 | 4571.479 | 4956.794 |
| 12 | 18308.64 | 4,981.865 | 4988.249 | 5408.692 |
| 13 | 19834.36 | 5,409.101 | 5410.236 | 5866.247 |
| 14 | 21360.08 | 5,839.807 | 5838.932 | 6331.076 |
| 15 | 22885.80 | 6,274,367 | 6273.723 | 6802.515 |
| 16 | 24411.52 | 6,713.174 | 6716.876 | 7283.019 |
| 17 | 25937.24 | 7,156.625 | 7168.533 | 7772.745 |
| 18 | 27462.96 | 7,605.124 | 7627.65 | 8270.56 |
| 19 | 28988.68 | 8,059.080 | 8096.087 | 8778.479 |
| 20 | 30514.40 | 8,518.908 | 8573.476 | 9296.106 |
| 21 | 32040.12 | 8,985.032 | 9059.227 | 9822.799 |
| 22 | 33565.84 | 9,457.878 | 9553.546 | 10358.78 |
| 23 | 35091.56 | 9,937.880 | 10055.31 | 10902.84 |
| 24 | 36617.28 | 10,425.477 | 10563.08 | 11453.41 |
| 25 | 38143.00 | 10,921.115 | 11077.12 | 12010.77 |

The new raw ΔT full scale signal value (120% set point) and the adjusted signals representing argon flow are loaded into the mass flow controller to complete the process.

The above descriptions of several exemplary embodiments are made by way of example and not for purposes of limitation. Many variations may be made to the embodiments and methods disclosed herein without departing from the scope and spirit of the present invention. The present invention is intended to be limited only by the scope and spirit of the following claims.

What is claimed is:

1. A process mass flow instrument for measuring the mass flow rate of a process fluid comprising:

a fluid inlet;

a fluid outlet;

a flow passage connecting the fluid inlet and the fluid outlet;

a fluid flow sensor which provides a raw output signal corresponding to an unknown mass flow rate; and a processor;

the processor containing a conversion routine for converting the raw output signal to an adjusted signal indicating the mass flow rate of the process fluid, wherein the conversion routine is empirically derived using at least one calibration mass flow instrument which is similar to the process mass flow instrument to correlate the output signals of the calibration mass flow instrument sensing the mass flow of a calibration fluid which is different than the process fluid with the output signals of the calibration mass flow instrument sensing the mass flow of the process fluid.

2. The process mass flow instrument of claim 1 further comprising a flow control portion for controlling the mass flow of the process fluid, the flow control portion being responsive to the adjusted output signal.

3. The process mass flow instrument of claim 2 wherein the flow control portion comprises a control unit, a valve drive and a valve.

4. The process mass flow instrument of claim 1 wherein the processor includes a memory and the conversion routine comprises a calibration table stored in the memory, the calibration table containing a plurality of adjusted signal values which indicate the mass flow of the process fluid, the processor using the raw output signal from the flow sensor to index the calibration table to convert the raw output signal to the adjusted signal indicating the mass flow rate of the process fluid.

5. The process mass flow instrument of claim 4 wherein the plurality of adjusted signal values comprises 25 adjusted signal values.

6. The process mass flow instrument of claim 4 wherein the processor further comprises an interpolation routine which performs a linear interpolation to determine the adjusted signal indicating mass flow of the process fluid.

7. The process mass flow instrument of claim 4 wherein a plurality of calibration tables are stored in the memory.

8. The process mass flow instrument of claim 1 wherein the conversion routine comprises a mathematical function which receives the raw output signal from the flow sensor as an input to convert the raw output signal to the adjusted signal which indicates the mass flow of the process fluid.

9. The process mass flow instrument of claim 8 wherein the mathematical function comprises a fourth-order polynomial equation.

10. The process mass flow instrument of claim 8 wherein a plurality of mathematical functions are stored in the memory.

11. The process mass flow instrument of claim 1 wherein the raw output signal is expressed as digital counts which are proportional to the raw signal.

12. The process mass flow instrument of claim 1 wherein the fluid flow sensor comprises a sensor tube through which a portion of the process fluid flow is directed;

a heater coupled to the midpoint of the sensor tube which transfers heat to the process fluid flowing through the sensor tube;

first and second temperature measuring elements mounted on the sensor tube on opposite sides of the heater for measuring the temperature of the process fluid flowing through the sensor tube, the first and second temperature sensing elements being equidistant from the heater; and means for detecting the temperature difference between the first and second temperature sensing elements and outputting a signal representing the temperature difference, wherein the temperature difference between the first and second temperature sensing elements represents the mass fluid flow through the sensor tube.

13. A process mass flow instrument for measuring the mass flow rate of a process fluid comprising:

a fluid inlet;

a fluid outlet;

means for sensing and indicating an unknown mass flow rate of the process fluid through the process mass flow instrument;

means for converting the indication of the unknown mass flow rate to indicating the actual mass flow rate of the process fluid, the conversion means being empirically derived by comparing the mass flow indications for a calibration fluid, which is different than the process fluid, flowing through at least 1 calibration mass flow instrument, which is similar to the process mass flow instrument, with the mass flow indications for the process fluid flowing through the calibration mass flow instrument.

14. The process mass flow instrument of claim 13 further comprising means for controlling flow.

* * * * *

UNITED STATES PATENT AND TRADEMARK OFFICE
CERTIFICATE OF CORRECTION

PATENT NO. : 5,975,126  
DATED : November 2, 1999  
INVENTOR(S) : Scott S. Bump, Gary P. Campbell, Joseph C. Dille, William W. White Page 1 of 1

It is certified that error appears in the above-identified patent and that said Letters Patent is hereby corrected as shown below:

Title page,
Under Item [63] Related U.S. Application Data, please delete "Pat. No. 5,730,181" and please insert -- Pat. No. 5,944,048 --.

Signed and Sealed this

Twentieth Day of November, 2001

*Attest:*

*Attesting Officer*

NICHOLAS P. GODICI
*Acting Director of the United States Patent and Trademark Office*